US012602614B2

(12) United States Patent
Schmidt et al.

(10) Patent No.: US 12,602,614 B2
(45) Date of Patent: Apr. 14, 2026

(54) TRAINING AN ARTIFICIAL INTELLIGENCE MODULE FOR INDUSTRIAL APPLICATIONS

(71) Applicant: ABB Schweiz AG, Baden (CH)

(72) Inventors: Benedikt Schmidt, Heidelberg (DE); Ido Amihai, Heppenheim (DE); Arzam Muzaffar Kotriwala, Ladenburg (DE); Moncef Chioua, Montreal (CA); Felix Lenders, Darmstadt (DE); Dennis Janka, Heidelberg (DE); Martin Hollender, Dossenheim (DE); Jan Christoph Schlake, Darmstadt (DE); Hadil Abukwaik, Weinheim (DE); Benjamin Kloepper, Mannheim (DE)

(73) Assignee: ABB Schweiz AG, Baden (CH)

( * ) Notice: Subject to any disclaimer, the term of this patent is extended or adjusted under 35 U.S.C. 154(b) by 716 days.

(21) Appl. No.: 17/956,097

(22) Filed: Sep. 29, 2022

(65) Prior Publication Data

US 2023/0094914 A1      Mar. 30, 2023

Related U.S. Application Data

(63) Continuation of application No. PCT/EP2021/056099, filed on Mar. 10, 2021, which
(Continued)

(51) Int. Cl.
*G06N 20/00*          (2019.01)
(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

2015/0324329 A1*  11/2015  Blevins ................ G05B 23/024
2018/0345496 A1*  12/2018  Li ............................. B25J 9/161
(Continued)

FOREIGN PATENT DOCUMENTS

CN            108647786 A      10/2018
CN            109325541 A       2/2019
(Continued)

OTHER PUBLICATIONS

Gatys et al., "A Neural Algorithm of Artistic Style," *Preprint arXiv—Cornell University Library*, 16 pp. (Sep. 2, 2015).
(Continued)

*Primary Examiner* — Kenneth B Lee, Jr.
(74) *Attorney, Agent, or Firm* — Fitch Even Tabin & Flannery LLP

(57) ABSTRACT

A computer-implemented method of generating a training data set for training an artificial intelligence module includes providing first and second data sets, the first data set including first data elements indicative of a first operational condition, the second data set including second data elements indicative of a second operational condition that matches the first operational condition. The method further comprises determining a data transformation for transforming the first data elements into the second data elements; applying the data transformation to the first data elements and/or to further data elements of further data sets, thereby
(Continued)

generating a transformed data set; and generating a training data set for training the AI module based on at least a part of the transformed data set.

15 Claims, 5 Drawing Sheets

Related U.S. Application Data is a continuation of application No. PCT/EP2020/059136, filed on Mar. 31, 2020.

(56) References Cited

U.S. PATENT DOCUMENTS

| | | | |
|---|---|---|---|
| 2018/0357514 | A1 | 12/2018 | Zisimopoulos et al. |
| 2019/0138941 | A1 | 5/2019 | Kam et al. |
| 2020/0074269 | A1 | 3/2020 | Trygg et al. |
| 2020/0094824 | A1 | 3/2020 | Schulter et al. |
| 2020/0202221 | A1* | 6/2020 | Wang .................... G06N 3/088 |

FOREIGN PATENT DOCUMENTS

| | | |
|---|---|---|
| CN | 109753998 A | 5/2019 |
| CN | 109947086 A | 6/2019 |
| CN | 110189288 A | 8/2019 |
| CN | 110785816 A | 2/2020 |
| JP | 6663524 B1 | 3/2020 |

OTHER PUBLICATIONS

European Patent Office, International Search Report in International Patent Application No. PCT/EP2021/056099, 3 pp. (Jun. 8, 2021).
European Patent Office, Written Opinion in International Patent Application No. PCT/ EP2021/056099, 8 pp. (Jun. 8, 2021).
Chen et al., "Data Augmentation Method Based on Conditional Generative Adversarial Net Model," *J. of Computer Applications*, 38(11): 3305-3311 (Nov. 10, 2018).
Xie et al., "A Transfer Learning Strategy for Rotation Machinery Fault Diagnosis Based on Cycle-Consistent Generative Adversarial Networks," *2018 Chinese Automation Congress (CAC)*, 5 pp. (Jan. 24, 2019).
China National Intellectual Property Administration, Office Action in Chinese Patent Application No. 202180025554.5, 14 pp. (Sep. 4, 2025).

* cited by examiner

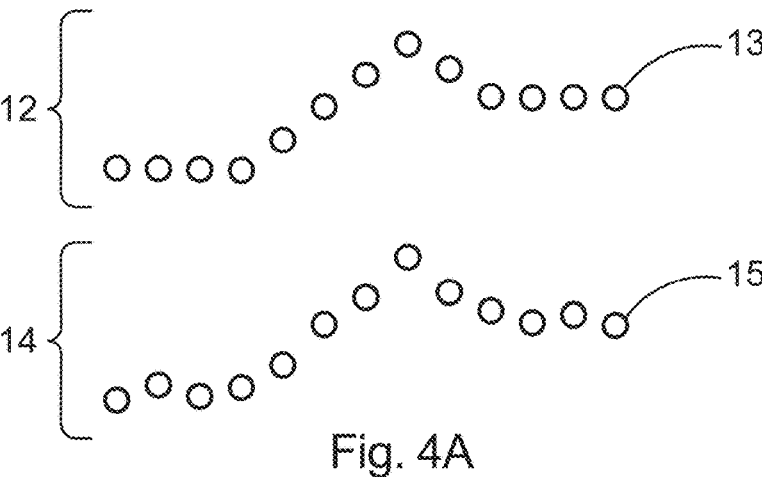
Fig. 4A
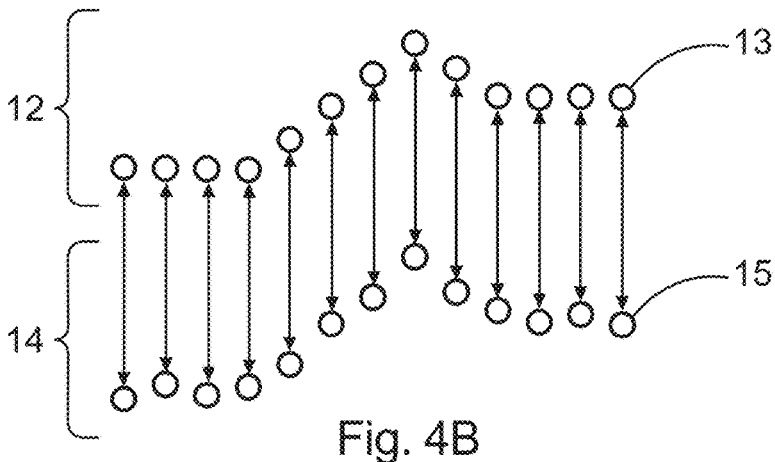
Fig. 4B
Fig. 4C

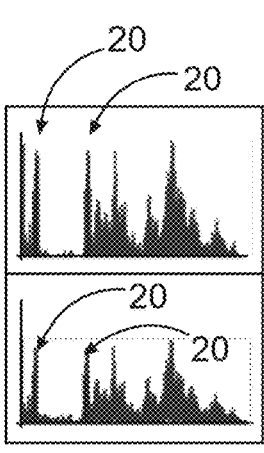
Fig. 6D
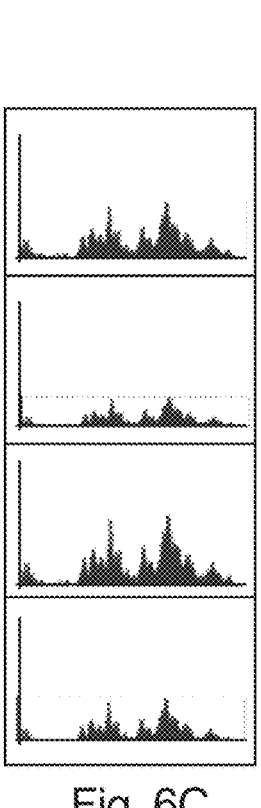
Fig. 6C
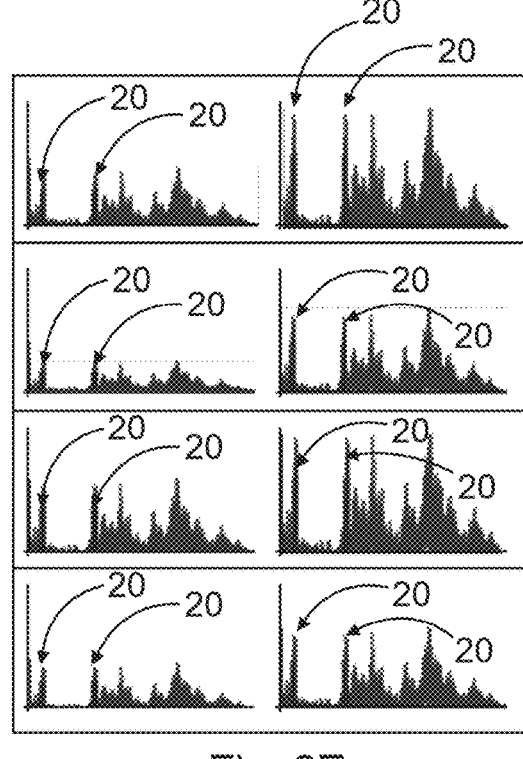
Fig. 6E
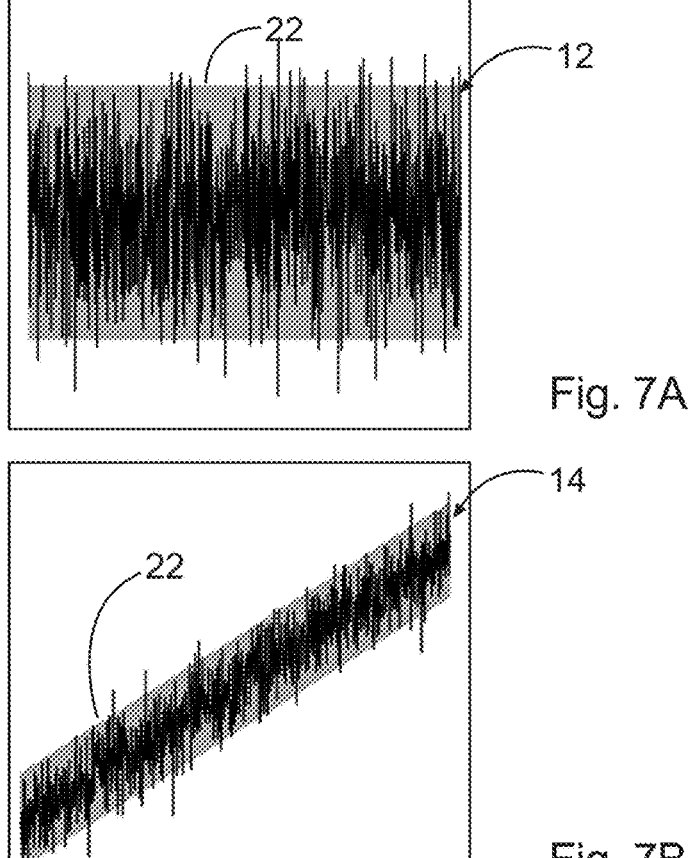
Fig. 7A
Fig. 7B

TRAINING AN ARTIFICIAL INTELLIGENCE MODULE FOR INDUSTRIAL APPLICATIONS

CROSS-REFERENCE TO RELATED APPLICATIONS

This patent application claims priority to International Patent Application No. PCT/EP2021/056099, filed on Mar. 10, 2021, which claims priority to International Patent Application No. PCT/EP2020/059136, filed on Mar. 31, 2020, each of which is incorporated herein in its entirety by reference.

FIELD OF THE DISCLOSURE

The present disclosure generally relates to industrial systems and, more particularly, to a computer-implemented method of generating a training data set for training an artificial intelligence module (referred to as "AI module" hereinafter) for industrial applications, such as for monitoring and/or controlling an industrial system.

BACKGROUND OF THE INVENTION

Industrial systems, such as industrial plants, power plants, process plants, electric transformation stations, relay stations, power supply stations, transformer stations, industrial drive systems, factory systems, manufacturing systems, drives, motors and the like, usually comprise one or more components which can be monitored and/or controlled during operation of the industrial system to ensure correct functioning of the industrial system and to reliably detect a malfunction and/or failure of the industrial system. For example, an industrial drive system can comprise one or more of a drive, a motor, a load, a transformer, a gearbox, a pump, a ventilation device, a heating device, an air conditioning device, a controller, a motion control, and a machinery, which can be monitored and/or controlled during operation of the industrial system. For this purpose, data, such as sensor data, related to the one or more components of the industrial system can be analyzed to determine whether the industrial system is fully functional and working correctly.

To analyze such data or data sets, an artificial intelligence module ("AI module"), such as an artificial neural network, may be used. In order to reliably determine whether the industrial system is fully functional and working correctly or in order to reliably detect (or predict) a failure of one or more components of the industrial system, the AI module should be trained with an appropriate and comprehensive training data set, which should preferably cover all conceivable working scenarios, operational scenarios, failure scenarios, and/or failure modes of the industrial system. Generally, however, data for training an AI module in industrial applications can be scarce, in particular data for certain failure scenarios and/or process transitions of industrial systems can be rare. As a consequence, a use of an AI module trained with such (limited) training data set for monitoring and/or controlling the industrial system may be limited.

BRIEF SUMMARY OF THE INVENTION

It may therefore be desirable to provide for an improved and/or enriched training data set for training an AI module in industrial applications, such as e.g. for monitoring and/or controlling an industrial system, as well as to provide for an improved (trained) AI module for monitoring and/or controlling an industrial system.

According to an aspect of the present disclosure, there is provided a computer-implemented method of generating a training data set for training an artificial intelligence module, AI module, e.g. for industrial applications, for monitoring an industrial system, for controlling an industrial system and/or for predicting a behavior of an industrial system. The method comprises:

providing, on a data storage, a first data set and a second data set, wherein the first data set includes one or more first data elements indicative, descriptive and/or representative of a first operational condition of an industrial system, wherein the second data set includes one or more second data elements indicative, descriptive and/or representative of a second operational condition of an industrial system, wherein the first operational condition substantially matches the second operational condition;

determining a data transformation for transforming and/or converting the one or more first data elements of the first data set into the one or more second data elements of the second data set;

applying the determined data transformation to the one or more first data elements of the first data set and/or to one or more further data elements of one or more further data sets, thereby generating at least one transformed data set; and generating a training data set for training the AI module based on at least a part of the at least one transformed data set.

By determining the data transformation and applying the data transformation to the one or more first data elements and/or to the one or more further data elements, a comprehensive training data set for training the AI module can be generated, which training data set can cover numerous scenarios of the industrial system and can be used to comprehensively train the AI module. Such trained AI module can then be used to monitor and/or control the industrial system, e.g. in order to ensure correct functioning of the industrial system and/or to reliably detect a failure or malfunction of the industrial system and/or one or more components thereof.

BRIEF DESCRIPTION OF THE SEVERAL VIEWS OF THE DRAWING(S)

Each of FIGS. 4A, 4B, and 4C illustrates one or more steps of a method of generating a training data set for training an AI module according to an exemplary embodiment of the present disclosure.

Figure 5:
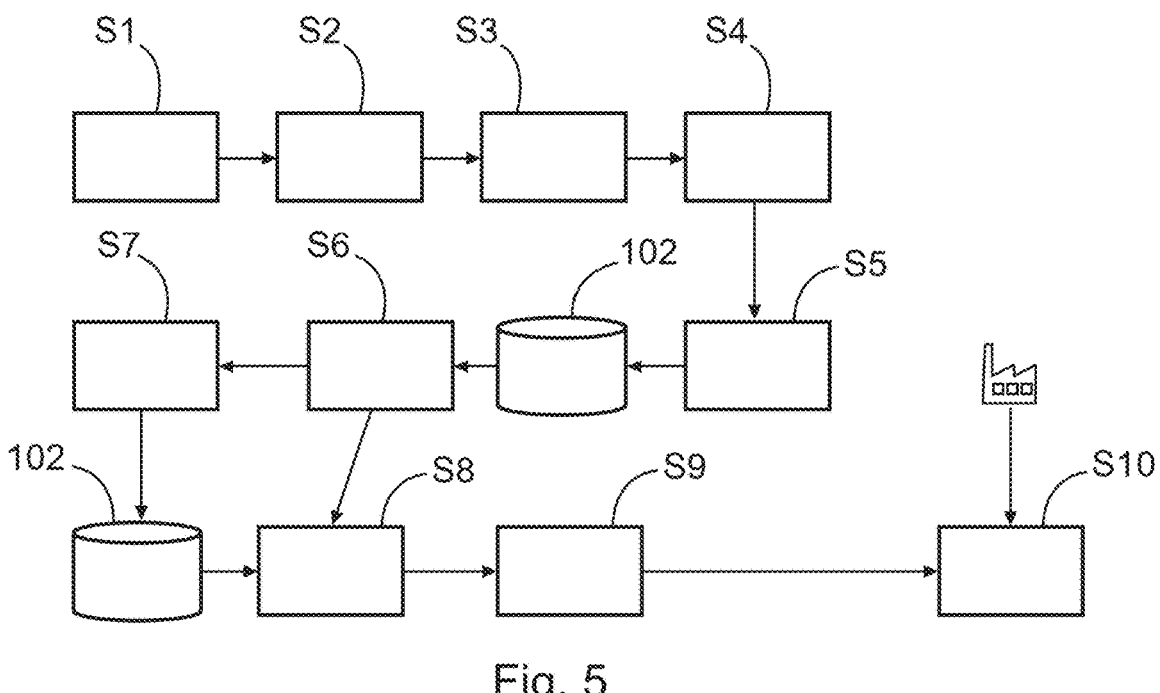

FIG. 5 is a flowchart illustrating steps of a method of generating a training data set for training an AI module according to an exemplary embodiment of the present disclosure.

Each of FIGS. 6A, 6B, 6C, 6D, and 6E illustrates one or more steps of a method of generating a training data set for training an AI module according to an exemplary embodiment of the present disclosure.

Each of FIGS. 7A and 7B illustrates one or more steps of a method of generating a training data set for training an AI module according to an exemplary embodiment of the present disclosure.

Figure 8:
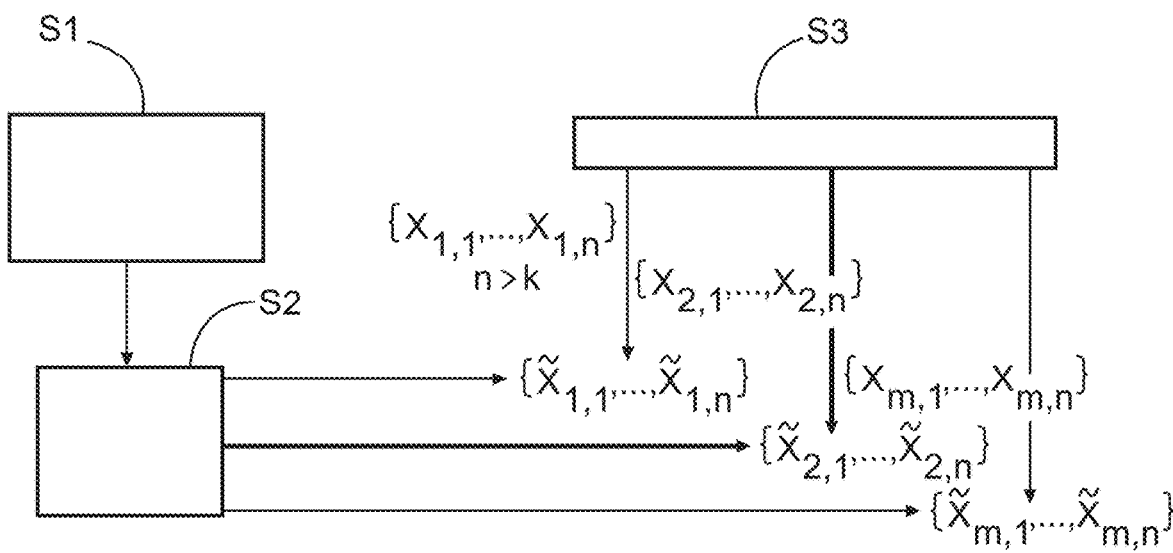

FIG. 8 is a flowchart illustrating steps of a method of generating a training data set for training an AI module according to an exemplary embodiment of the present disclosure.

Figure 9:
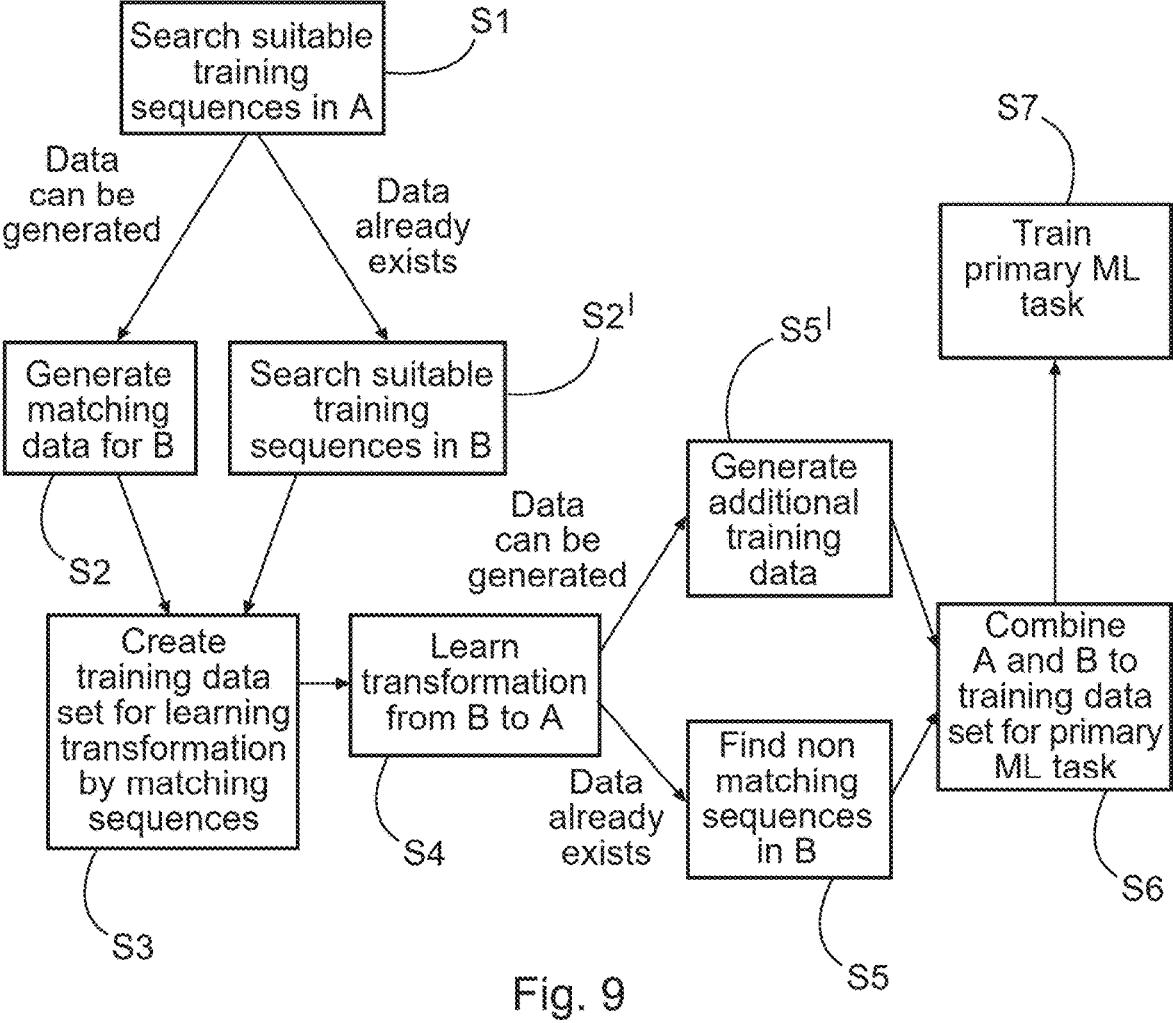

FIG. 9 is a flow chart illustrating steps of a method of generating a training data set for training an AI module according to an exemplary embodiment of the present disclosure.

DETAILED DESCRIPTION OF THE INVENTION

Figure 1:
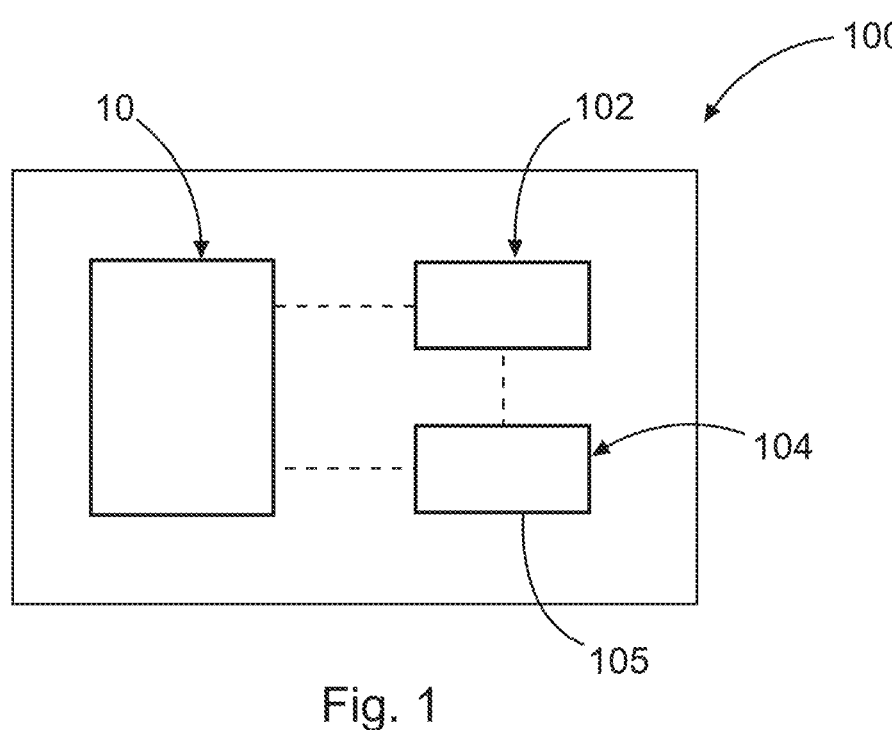
FIG. 1 is a block diagram of a computer with an AI module according to an exemplary embodiment of the present disclosure.

FIG. 1 shows computer 100 with an artificial intelligence module 10 according to an exemplary embodiment. The computer 100 further comprises a data storage 102 for storing data. For instance, the first data set, the second data set, the transformed data set, the initial training data set, the training data set, one or more further data sets and/or other data can be stored on the data storage 102. The computer 100 further comprises a processing circuitry 104 including one or more processors 105 for data processing. Further, the a computer program and/or software instructions can be stored in the data storage 102, which when executed by the processing circuitry 104, instruct the computer 100 to perform the method of generating the training data set and/or the method of training the AI module 10 in accordance with the present disclosure.

Generally, the AI module 10 may refer to a classifier and/or classifier circuitry 10 configured to provide a classification result based on one or more inputs and/or input data, such as for example data, measurement data and/or simulation data indicative of an operation of an industrial system. Therein, the AI module 10 may refer to any type of artificial intelligence device and/or circuitry, e.g. employing and/or running one or more machine learning algorithms on one or more processors, e.g. processor 105 or other processors, and/or data processing devices. Such machine learning algorithm and/or the AI module 10 may be based e.g. on logistic regression, a support vector method, boosting, a naïve Bayes method, a Bayesian network, a k-Nearest Neighbors algorithm, an artificial neural network, a convolutional neural network, Kernel-density estimation, Gaussian regression, a generative adversarial network, a sum product network, an adversarial neural network or the like.

The computer 100 and/or the AI module 10 may be configured for generating a training data set of training the AI module 10 and/or for training the AI module 10. Alternatively or additionally, the computer 100 and/or the AI module 10 may be configured to monitor and/or control an industrial system.

Figure 2:
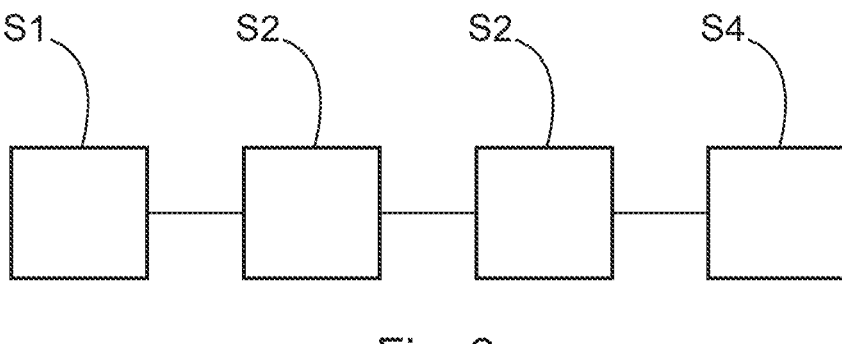
FIG. 2 is a flowchart illustrating steps of a method of generating a training data set for training an AI module according to an exemplary embodiment of the present disclosure.

FIG. 2 shows a flow chart illustrating steps of a method of generating a training data set for training an AI module 10 according to an exemplary embodiment. In accordance with the method, Step S1 comprises providing, on a data storage 102, a first data set and a second data set, wherein the first data set includes one or more first data elements indicative of a first operational condition of an industrial system, wherein the second data set includes one or more second data elements indicative of a second operational condition of an industrial system, wherein the first operational condition substantially matches the second operational condition. Step S2 comprises determining a data transformation for transforming the one or more first data elements of the first data set into the one or more second data elements of the second data set. Step S3 comprises applying the determined data transformation to the one or more first data elements of the first data set and/or to one or more further data elements of one or more further data sets, thereby generating one or more transformed data sets. Step S4 comprises generating a training data set for training the AI module 10 based on at least a part of the one or more transformed data sets.

Figure 3:
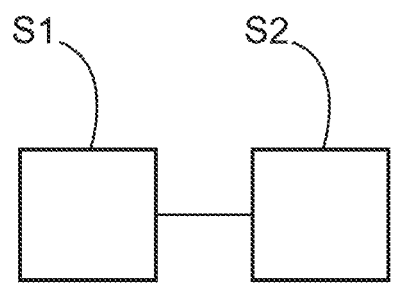
FIG. 3 is a flowchart illustrating steps of a method of training an artificial intelligence module according to an exemplary embodiment of the present disclosure.

FIG. 3 shows a flow chart illustrating steps of a method of training an artificial intelligence module 10 according to an exemplary embodiment, in particular with a training data set as generated in accordance with the method FIG. 2 and/or in accordance with various aspects of the present disclosure. Step S1 comprises generating a training data set, e.g. as described with reference to FIG. 2 and/or with reference to one or more aspects of the present disclosure. Step S2 comprises training the AI module 10 with the generated training data set. For instance, at least one machine learning algorithm may be utilized for processing the training data set, e.g. in order to adjust one or more weights and/or parameter values of the AI module 10. Alternatively or additionally the training may be based on supervised learning, semi-supervised learning, unsupervised learning, deep learning, and/or reinforcement learning.

FIGS. 4A to 4C illustrate steps of a method of generating a training data set for training an AI module 10 according to an exemplary embodiment. In the example shown in FIGS. 4A to 4C a first data set 12 comprising a plurality of first data elements 13 and a second data set 14 comprising a plurality of second data elements 15 are illustrated and compared to each other. The first data set 12 and the second data set 14 may correspond to equidistantly sampled data, e.g. time series data.

The first data set 12 corresponds to simulation data 12 descriptive of simulating an operation of the industrial system, and the second data set 14 corresponds to operational data 14 or measurement data 14 descriptive of an actual operation of the industrial system.

For instance, FIG. 4A shows a comparison of equidistantly sampled first data elements 13 from a simulator and second data elements 15 measured or determined during operation of the industrial system. The simulator data, first data elements 13 and/or the first data set 12 does not contain measurement noise or other noise effects, e.g. due to environmental influences, such as a temperature influence, and a machine learning model and/or an AI module 10 trained on the first data set 12 might not be able to perform an accurate prediction on the noisy data occurring during operation of the industrial system (and vice versa).

FIG. 4B illustrates a matching of the first data elements 13 with the second data elements 15. Since in the example of FIGS. 4A to 4C the first and second data sets 12, 14 are equidistantly sampled, each data element 13 from the first data set 12 can be matched to a data element 15 from the second data set 14. This enables for instance to determine, derive, and/or learn a noise and/or a distribution of noise, indicated by triangles in FIG. 4C, which can be added to e.g. further simulator data, one or more further data sets and/or the first data set 12 in order to resemble the second data set 14 more closely.

Accordingly, based on comparing the first data elements 13 with the second data elements 15, a data transformation for converting and/or transforming the first data elements 13 to the second data elements 15 can be determined. When this determined data transformation is applied to the data elements 13 of the first data set 12 and/or to one or more further data elements of one or more further data sets, such as further simulation data and/or further operational data, one or more transformed data sets can be generated, which more closely resemble the second data set 14. In the example illustrated in FIGS. 4A to 4C such data transformation comprises the addition of noise to the first data set and/or further data set(s), such that the noise is reflected and/or reproduced in the transformed data set(s).

The determined data transformation, noise and/or noise distribution can then be applied to further data sets and/or further data elements, which can be used to train the AI module 10, as shown in FIG. 4C. Accordingly, from the learned noise distribution, a new sequence similar to real data of the industrial system can be sampled, as illustrated in FIG. 4C.

The determination and/or learning of the data transformation, noise and/or noise distribution could be achieved by using the AI module 10 and/or methods like, inter alia, kernel-density estimation, Gaussian regression, and/or adversarial neural networks. It should be noted that FIGS. 4A to 4C illustrate this determination and/or learning problem as univariate, but in most cases it may be multivariate, e.g. considering several signals and in particular setpoint values and possibly also embedding of non-time-series data like general weather conditions, alarms, events, produced product, and many more.

In an alternative learning approach, the data transformation might not be approached by learning a distribution around the original data elements 13 from simulation, but as a (not-probabilistic) regression problem.

Generally, it may be advantageous if the first data set 12 and the second data set 14 are sufficiently comparable in terms of operational conditions, e.g. the first and second operational condition, in order to be presented together to a machine learning algorithm and/or AI module 10.

FIG. 5 shows a flowchart illustrating steps of a method of generating a training data set for training an AI module 10 according to an exemplary embodiment. In particular, FIG. 5 illustrates the process of finding suitable data sets 12, 14, determining a data transformation (or learning the data transformation), generating additional training data or transformed data sets with help of further simulation data, transforming the further simulated data, training the AI module 10 and/or the machine learning model, e.g. for prediction, monitoring, and/or control of the industrial system, and using the trained AI module 10 and/or applying the machine learning model.

For example, in step S1 steady states may be searched in a data set, e.g. the first data set 12 and/or the second data set 14, and operator changes may optionally be applied in step S2. Further, the first and second data set 12, 14 and/or data elements 13, 15 thereof may be matched in step S3. For instance, simulation data 12 may be generated for a matching steady state of the industrial system (illustrated as plant in FIG. 5). Optionally, operator changes may be applied to the second data set in step S4. Further, transformation samples may be generated in step S5 based on the first and second data set 12, 14, e.g. as illustrated in FIGS. 4A to 4C, and may be stored in the data storage 102. From the stored transformation samples, which may correspond to matching first and second data sets 12, 14 and/or matching first and second data elements 13, 15, the data transformation can be derived, e.g. learned using the AI module 10, in step S6. Moreover, additional simulation data, i.e. further data set(s) can be generated in step S7 and stored in the data storage 102. The data transformation determined in step S6 can then be applied to these additional simulation data or further data sets to generate transformed data and/or a transformed data set(s) and to generate a training data set in step S8, e.g. based on combining a plurality of transformed data sets. Using the training data set, the AI module 10 can be trained in step S9 for monitoring and/or controlling the industrial system. Further, the trained AI module 10 can then be used in step S10 to monitor, control and/or predict a behavior of the industrial system.

It should be noted that while in the examples of FIGS. 4A to 5, the first data set 12 corresponds to simulation data, the process could also be reversed to transform operational data to resemble simulator data and feed the transformed data to the AI module 10 and/or a machine learning model, which may (primarily) be trained on simulator data.

Moreover, the method illustrated in FIG. 5 could also applied when learning how to transform data from different industrial systems, e.g. from plant A, such as a small scale experimental plant, to plant B, such as a large scale productive plant.

Figure 6A:
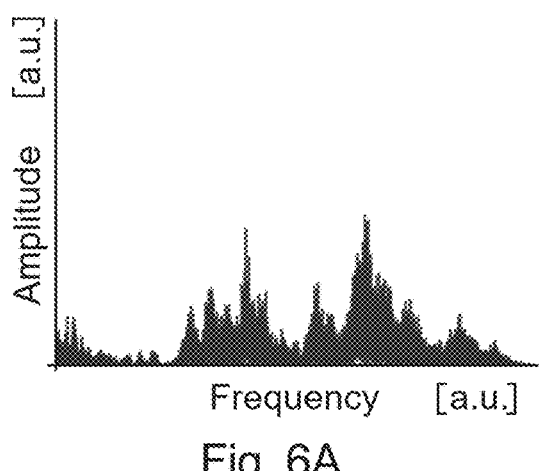
Figure 6B:
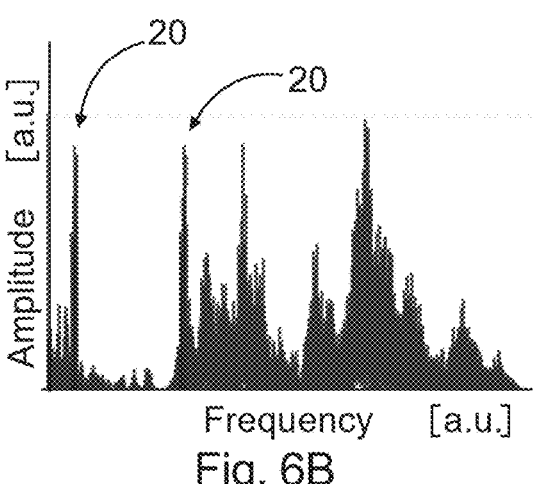

FIGS. 6A to 6E illustrate steps of a method of generating a training data set for training an AI module 10 according to an exemplary embodiment. In particular, FIGS. 6A to 6C illustrate an exemplary use case of the present disclosure for implementing a data-driven flow indicator for leakage detection in an industrial system. FIGS. 6A to 6E each show the amplitudes of a Fast Fourier Transform of data elements as a function of frequency in arbitrary units.

Flow measurements may be an important component of controlling and/or monitoring operation of industrial systems or plants. Since flow induced vibration signals can be correlated with volume flow rate, vibration data can be leveraged to develop a data-driven flow indicator for leakage detection.

To develop such a flow indicator, training data, e.g. an initial training data set, may be gathered, for instance, using either a process simulator or test rig, wherein sensors may be installed at different positions of interest along a pipe of the test rig. By running controlled experiments, the system can be run in different states e.g. "uninterrupted flow" and "flow with leakage". Given different flow states, a classification model and/or the AI module 10 can be trained, e.g. based on mapping the Fast Fourier Transforms (FFT) of raw vibration data to these states.

For a data-driven flow detector, its success may hinge on its relevance in real-world setups. Therefore, it may be advantageous that the AI module 10 has high generalization power, in that it is able to detect flow reliably even in cases it has not been exposed to in the training data set or initial training data set. However, experiments done using process simulators or test rigs may not contain measurement noise or other noise effects due to environmental influences, such as e.g. excitation of frequencies due to additional pumps running in the industrial system.

For example, FIG. 6A shows the FFT of experimental data of an experiment done at a test rig showing an uninterrupted flow. FIG. 6B shows the FFT of operational or real data during operation of the industrial system. As can be seen, the amplitudes of the FFT of experimental data shown in FIG. 6A are smaller than the amplitudes in FIG. 6B. In addition, additional data elements and/or additional frequencies 20 occur in the FFT of operational or real data shown in FIG. 6B.

For FIGS. 6A and 6B, the system configurations were set the same for the test rig and real plant with the difference that the real setup includes an additional pump operating, which results in the additional frequencies 20. By looking at these figures, it can be observed that the same frequencies are excited in both, however, the real plant data of FIG. 6B has some additional excitation of frequencies 20 and has roughly double the amplitude. Consequently, a machine learning model and/or AI module 10 trained on data from this test rig shown in FIG. 6A may not perform well on the given real noisy plant data shown in FIG. 6B.

Whilst it may be possible to conduct many controlled experiments in simulation and at test rigs, conducting similar experiments at real plants or industrial systems may pose certain constraints including cost, safety and resources. Practically, given the opportunity, very limited number of experiments may be conducted at the real plant or industrial system. By controlling the experiments, data sequences, data sets and/or data elements can easier be matched between real or operational data and synthetic or simulation data.

In accordance with the present disclosure, however, a data transformation between such different data sets can be determined. The data transformation can then be applied to one or more further data sets to augment an initial training data set for training a machine learning model and/or the AI module 10. This process is depicted in FIGS. 6C to 6E.

In particular, FIG. 6C shows simulation data from simulation experiments similar to those depicted in FIG. 6A. Therein, the data shown in FIG. 6C may correspond to a first data set 12. Further, FIG. 6D shows operational data or measurement data of an industrial system with the additional data elements or frequencies 20, which can be regarded as noise or noise effect in the context of the present disclosure. Therein, the data shown in FIG. 6D may correspond to a second data set 14. Based on comparing the first data set 12 and the second data set 14, the data transformation may be determined, which may include the addition of the noise or noise effect resulting in the frequencies 20 shown in FIG. 6D. The determined data transformation can then be applied to the first data set 12 and/or to further data sets to generate one or more transformed data sets as exemplary shown in FIG. 6E, wherein due to the application of the data transformation, the additional data elements or frequencies 20 are reproduced, reflected and/or included. The output augmented or transformed data sets can then be used to generate the training data set to a train machine learning model and/or the AI module 10, which are likely to have higher generalizability power and thus be better suited to real plants or industrial systems.

FIGS. 7A and 7B illustrate steps of a method of generating a training data set for training an AI module according to an exemplary embodiment. In particular, FIGS. 7A and 7B illustrate an exemplary use case of the present disclosure for augmenting and/or enriching failure data. FIGS. 7A and 7B each show an amplitude of a signal or data elements as a function of time in arbitrary units.

A first data set 12 is shown in FIG. 7A which may refer to nominal operational data from healthy or nominal operation of the industrial system. A second data set 14 is shown in FIG. 7B which may refer to or contain failure data with the presence of a failure or process abnormality. Usually, such abnormal (i.e. faulty) events or data are scarce. Such data, however, can be generated in accordance with the present disclosure.

For instance, one or more faulty episodes or segments of data sets can be transformed using the characteristics of the non-faulty data set, or vice versa. In order to generate the non-faulty data elements, the distribution of the non-faulty data set can be estimated using e.g. an empirical distribution, kernel density estimation, and/or generative models, such as e.g. generative-adversarial-networks, variational auto-encoders. This way, the data transformation can be derived. Subsequently, this distribution estimate and/or the data transformation can be used e.g. in combination with existing faulty data elements or data sets, to generate new faulty data elements or data sets. For example, this can be done by estimating the standard-deviation 22 around each point or data element in the non-faulty data time-series 12, and then sampling points or data elements around the mean of the faulty data time-series or data set 14 in the range of ±2 standard deviations 22 (around 95% of the data). This may assume that the faulty data set 14 has about as much variance as the non-faulty data set 12 but is centered around different values.

FIG. 8 shows a flow chart illustrating steps of a method of generating a training data set for training an AI module 10 according to an exemplary embodiment.

In FIG. 8, X1, . . . , m indicate different fault modes and/or fault scenarios, and n are the number of examples, data elements and/or data sets from each mode. Thicker arrows in FIG. 8 point to the generation of more complex examples, data elements and/or data sets.

For instance regarding the machine learning stage, FIG. 8 illustrates model training and/or training of the AI module 10 and the generation of transformed data set(s) and/or training data set(s). In FIG. 8, X (and y or k) may refer to data labels, so that X1, . . . , m may indicate different fault modes and y or k indicates normal data. The model and/or AI module 10 may predict the probability of label X and y or k given the input data.

In this case, the normal data that is used to learn the distribution to be transformed to faulty data may preferably match the operational condition of the faulty data to capture the distribution correctly. This can be achieved by selected data based on proximity of operational conditions like number of rotations per minutes or power consumption for rotating equipment in general or process conditions like flows, temperatures or pressures.

In step S1 of FIG. 8, sensor data that is non-faulty, e.g. with multiple operation modes may be determined. The sensor data may be used as first and/or second data set. In step S2, the data transformation may be determined based thereon, e.g. through kernel-density-estimation. The data transformation may then be applied in step S3 to faulty examples, data elements, and or data sets, indicated by Xn, m in FIG. 8, in order to generate transformed data sets, indicated by Xn, m with the accent ~ in FIG. 8.

FIG. 9 shows a flow chart illustrating steps of a method of generating a training data set for training an AI module 10 according to an exemplary embodiment.

In step S1, one or more data sets, e.g. the first data set 12, is searched for interesting data elements and/or sequences. A data element and/or sequence can be interesting because of certain data characteristic, such as e.g. process values, changes in setpoints, certain load situation for assets likes pumps, and/or external reasons, such as e.g. presence of a failure like a pipe leakage. It may then be checked if a corresponding second data set 14 exists or a second data set 14 can be generated by simulation and/or experiments. The second data set 14 can be generated in step S2 mimicking the configuration and/or sequences present in the sequences found in the first data set 12. If the second data set 14 is e.g. only a historical data set and new data cannot be generated by simulation and/or experiments, similar sequences can be searched for in the second data set 14 in step S2'.

In the next step S3, a preliminary training data set can be generated that can be used in step S4 for determining and/or learning the data transformation for transforming data elements of the first data set 12 into data elements of the second data set 14, or vice versa. For instance, data elements from the first and the second data set 12, 14 can be matched, e.g. into a predictor sequence from one of the data sets and a label sequence from the other data set.

With this preliminary training data set a machine learning algorithm and/or the AI module 10 can be trained to perform the data transformation, e.g. by learning a probability distribution p(A|B) with help of Gaussian Regression, Kernel Density Estimation, Sum Product Networks, or Generative Adversarial Networks, or by simply learning a regression function mapping values from one data set to the other data set.

Once the data transformation is learned and/or determined, one or more transformed data sets can be generated and e.g. merged in a training data set in step S5. Alternatively, in step S5' data elements from one of the first or second data sets 12, 14 can be transformed without matching sequences in the other one of the first and second data set 12, 14 in order to create a (combined) training data set in step S6 for training in step S7 the AI module 10 for a primary machine learning task, such as e.g. a machine learning model for predictive maintenance, process monitor, time-series prediction, or the like.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

Generally, the AI module may refer to a classifier and/or classifier circuitry configured to provide a classification result based on one or more inputs and/or input data, such as for example data, measurement data, operational data and/or simulation data indicative of an operation of the industrial system. Therein, the AI module according to the present disclosure may refer to any type of artificial intelligence device and/or circuitry, e.g. employing and/or running one or more machine learning algorithms on one or more processors and/or data processing devices. Such machine learning algorithm and/or the AI module may be based e.g. on logistic regression, a support vector method, boosting, a naïve Bayes method, a Bayesian network, a k-Nearest Neighbors algorithm, an artificial neural network, a convolutional neural network, Kernel-density estimation, Gaussian regression, a generative adversarial network, a sum product network, an adversarial neural network or the like.

In the context of the present disclosure, the industrial system may refer to any type of industrial system, such as for example a plant, a power plant, a process plant, an electric transformation station, a relay station, a power supply station, a transformer station, an industrial drive system, a factory system, a manufacturing system, a drive, a motor and the like. Further, an operational condition of the industrial system may be indicative, descriptive and/or representative of a state and/or a working state of the industrial system, such as e.g. a running state, an idle state, an off state, or the like. Alternatively or additionally, the operational condition of the industrial system may be indicative, descriptive and/or representative of environmental factors and/or parameters affecting an operation of the industrial system, such as e.g. a temperature, a pressure, a fluid level, a ventilation, and/or a flow rate of a fluid in at least a part of the industrial system.

In the context of the present disclosure the first operational condition substantially matching the second operational condition may mean that the first operational condition is similar and/or equivalent to the second operational condition. Accordingly, the first data set and the second data set (and/or the first and second data elements) may describe similar, equivalent and/or matching operational conditions of the industrial system. Accordingly, the first and second data set (and/or the first and second data elements) may be comparable and/or match each other in terms of the first and second operational conditions of the industrial system. Hence, it is possible to derive a meaningful data transformation for transforming the one or more first data elements into the one or more second data elements. It should be noted, however, that the first and second data sets can differ from one another in one or more further operational conditions, i.e. operational conditions other than the first and second operational condition, as described in more detail herein.

Generally, the first data set and the second data set can refer to data sets indicative, descriptive and/or representative of an operation of the industrial system. Therein, the first data set and the second data may have the same source and/or may be of the same data type. For example, the first and second data set may refer to measurement data (also referred to as operational data) of the same industrial system, such as e.g. sensor data acquired during operation of the industrial system, or to simulation data simulating an operation of the industrial system (or one or more components thereof). Alternatively, the first and second data set (and/or the further data set) may have different sources and/or different data types. For instance, the first data set may refer to measurement data of a first industrial system and the second data set may refer to measurement data of a second industrial system, different than the first industrial system. Alternatively or additionally, one of the first and second data set may refer to measurement data of the an industrial system, and the other one of the first and second data set may refer to simulation data of the an industrial system. Alternatively or additionally, the first data set and the second data set may differ in one or more operational conditions other than the first and second operational conditions. For instance, one of the first and second data set may contain additional data or data elements compared to other one of the first and second data set. Such additional data or data elements, may for example be failure data, data from one or more additional components of the industrial system, data related to environmental parameters, alert data, event data, or the like. Accordingly, the first and second data set may substantially match each other with respect to the first and second operational condition, but the first and second data set may optionally differ from one another in terms of one or more additional operational conditions.

Similarly, the further data set can refer to a data set indicative, descriptive and/or representative of an operation of the industrial system. The further data set may, for instance, refer to measurement data, operational data, and/or simulation data of the industrial system.

The data transformation for transforming the one or more first data elements into the one or more second data elements may, generally, allow to convert the one or more first data elements into the one or more second data elements. This may, for example, mean that the transformed data set can comprise one or more data elements which more closely resemble the one or more second data elements than the one or more first data elements. Hence, the term "data transformation" is to be understood broadly and e.g. does not necessarily mean that application of the data transformation to the first data elements results in exactly the second data elements. Rather, by applying the data transformation to the one or more first data elements (and/or further data elements), the second data elements may be approximated and/or mimicked.

By way of example, the first data set and the second data set may differ from one another in terms of e.g. a noise present in only one of the data sets, a missing value in one of the data sets, a shape of a measurement curve described by the data elements of the data sets, and/or a value of a parameter represented by the one or more data elements of the data sets. Such differences can be reflected by and/or comprised in the data transformation, such that by applying the data transformation, the above-mentioned differences in the first and second data sets are reflected and/or reproduced in the transformed data set.

Accordingly, determining the data transformation may comprise comparing the one or more first data elements with the one or more second data elements. Alternatively or additionally, determining the data transformation may comprise determining a deviation and/or difference between the one or more first data elements and the one or more second data elements. By applying the determined data transformation to the one or more first data elements and/or the one or more further data elements and by generating the transformed data set, a difference and/or deviation between the first data set and the second data set can be mitigated, such that the transformed data set more closely resembles the second data set as the first data set resembles the second data set. Generally, this may allow to generate numerous transformed data sets, e.g. based on synthetic data sets, which can be combined in a comprehensive training data set for training the AI module For example, this may allow to use simulation data to supplement measurement data for training the AI module, and vice versa. Alternatively or additionally, data from various different industrial systems and/or different simulations can be combined, based on applying the data transformation to one or more of them. Alternatively or additionally, data sets including failure data can be combined with non-failure data sets or data sets without failure data, as will be described in more detail below.

According to an embodiment, generating the training data set comprises:

providing an initial training data set for training the AI module; and supplementing, augmenting and/or enriching the initial training data set with the at least part of the at least one transformed data set.

Therein, the initial training data set may comprise initial training data, which may optionally include the second data set. By supplementing the initial training data set, an improved training data set can be provided allowing to comprehensively train the AI module, such that the trained AI module can identify a plurality of different operational scenarios and/or operational conditions of the industrial system.

According to an embodiment, supplementing the initial training data set comprises adding the at least part of the at least one transformed data set to the initial training data set. Alternatively or additionally, supplementing the initial training data set comprises replacing at least a part of the initial training data set with the at least part of the at least one transformed data set. This way, the initial training data set can be effectively enriched, augmented, supplemented and/or improved.

According to an embodiment, the method further comprises identifying and/or selecting, in the first data set, e.g. based on processing the first data set, the one or more first data elements indicative of the first operational condition of the industrial system. The method further comprises identifying and/or selecting, in the second data set, e.g. based on processing the second data set, the one or more second data elements indicative of the second operational condition of the industrial system. The one or more first and second data elements may be identified and/or selected, such that the first data elements substantially match the second data elements in terms of the first and second operational condition. Accordingly, the first and second data set may be searched for matching data elements, e.g. data sequences, across the first and second data set.

According to an embodiment, the one or more first data elements of the first data set are time-related. Alternatively or additionally, the one or more second data elements of the second data set are time-related. In other words, the first and/or second data set may comprise time-related data elements and/or may correspond to time-series or a time sequence of data elements.

According to an embodiment, the method further comprises matching, with respect to at least one operational parameter of the industrial system, the one or more first data elements to the one or more second data elements, wherein the at least one operational parameter is indicative of an operation of the industrial system. Therein, the at least one operational parameter can be indicative of, for example, an event, a state, a condition, a working condition, an operation time, a time, and/or a working state of the industrial system. Alternatively or additionally, the at least one operational parameter can be indicative of an environmental factor or influence, potentially affecting operation of the industrial system, such as e.g. a temperature, a pressure, a fluid level, a ventilation, and/or a flow rate of a fluid in at least a part of the industrial system. Based on matching the one or more first and second data elements, pairs of data elements associated with and/or corresponding to each other can be identified, which may allow to determine an accurate data transformation for these pairs of data elements.

According to an embodiment, the at least one operational parameter is an operation time of the industrial system. Alternatively or additionally, the one or more first data elements are matched to the one or more second data elements with respect to an operation time of the industrial system.

According to an embodiment, the data transformation is determined element-wise for each of the one or more first data elements. Accordingly, the transformed data set may comprise one or more transformation (or transformed) data elements, each corresponding to one of the first data elements and/or one of the further data elements transformed by the data transformation.

According to an embodiment, determining the data transformation comprises determining a functional relationship between the one or more first data elements and the one or more second data elements. Such functional relationship may, for example, refer to a mathematical relationship allowing to convert the one or more first data elements into the one or more second data elements.

For example, the data transformation may include addition of data elements, removal of data elements, adjustment of data elements, scaling of data elements, transforming data elements into a different reference or coordinate system, or the like.

According to an embodiment, the data transformation is determined using a machine learning algorithm, e.g. implemented in the AI module. By way of example the data transformation can be determined using at least one of Kernel-density estimation, Gaussian regression, an artificial neural network, a generative adversarial network, a sum product network, and an adversarial neural network. However, any other machine learning algorithm may be used. Accordingly, the data transformation may be learned by the machine learning algorithm, which may be implemented in the AI module. The trained machine learning algorithm or AI module may then be used to apply the data transformation to the one or more first data elements and/or to one or more further data elements of one or more further data sets to generate one or more transformed data sets. A plurality of transformed data sets can then be combined in the training data set.

According to an embodiment, the data transformation is determined in a non-probabilistic manner. For example, the data transformation can be determined based on regression and/or based on solving a regression problem.

According to an embodiment, at least one of the first data set and the second data set includes simulation data descriptive of simulating an operation of the industrial system, e.g. in a simulation calculation, wherein at least one of the first data set and the second data set includes operational data descriptive of an actual operation of the industrial system. Therein, the operational data may refer to measurement data, e.g. comprising sensor data, actuator data, control data, and/or event data of the industrial system.

According to an embodiment, the first data set includes simulation data descriptive of simulating an operation of the industrial system, e.g. at the first operational condition, and the second data set includes operational data descriptive of an actual operation of the industrial system. For instance, the first data elements can be simulation data elements and the second data elements can be operational data elements. Further, determining the data transformation comprises determining a noise of the one or more second data elements of the second data set, such that by applying the data transformation, e.g. to the one or more first data elements and/or to one or more further data elements of one or more further data sets, the noise is reproduced in the transformed data set. Accordingly, by applying the data transformation to the one or more first data elements and/or to one or more further data elements of one or more further data sets, the noise of the one or more second data elements can be added to the one or more first data elements and/or to one or more further data elements of one or more further data sets, e.g. such that the transformed data set includes the noise.

According to an embodiment, the determined noise is representative of a measurement noise of the one or more second data elements, such as e.g. a statistical fluctuation of a measurement or sensor signal. Alternatively or additionally, the determined noise is representative of an environmental influence affecting the actual operation of the industrial system, such as e.g. an additional component running, an additional pump running, a temperature of a part of the industrial system, an ambient temperature, and the like. Accordingly, in the context of the present disclosure, the term noise is to be understood broadly as e.g. comprising measurement noise as well as other characteristics or environmental influences reflected in the one or more second data elements.

According to an embodiment, at least one of the first data set and the second data set includes failure data descriptive of an operational failure of the industrial system, wherein at least one of the first data set and the second data set includes nominal operational data descriptive of a nominal or normal operation of the industrial system. The nominal operational data may refer to data lacking failure data.

According to an embodiment, the first data set includes nominal operational data descriptive of a nominal operation of the industrial system and the second data set includes failure data descriptive of an operational failure of the industrial system, wherein determining the data transformation comprises determining, in the second data set, the failure data descriptive of the operational failure of the industrial system, such that by applying the data transformation, e.g. to the one or more first data elements and/or to one or more further data elements of one or more further data sets, the operational failure of the industrial system is reproduced in the transformed data set. Accordingly, by applying the data transformation to the one or more first data elements and/or to one or more further data elements of one or more further data sets the operational failure of the industrial system can be added to the one or more first data elements and/or to one or more further data elements of one or more further data sets, e.g. such that the transformed data set includes and/or reflects the operational failure of the industrial system.

According to a further aspect of the present disclosure, there is provided a computer program, which, when executed by one or more processors of a computer, instructs the computer to perform steps of the method of generating a training data set for training an artificial intelligence module.

According to a further aspect of the present disclosure, there is provided a non-transitory computer-readable medium storing a computer program, which, when executed by one or more processors of a computer, instructs the computer to perform steps of the method of generating a training data set for training an artificial intelligence module.

A further aspect of the present disclosure relates to a use of a training data set generated according to the method of generating a training data set for training an artificial intelligence module usable for monitoring and/or controlling an industrial system.

According to a further aspect of the present disclosure, there is provided a computer-implemented method of training an artificial intelligence module, AI module. The method comprises:

generating a training data set according to the method of generating a training data set for training an artificial intelligence module; and training the AI module with the generated training data set.

According to a further aspect of the present disclosure, there is provided a computer comprising an AI module for monitoring and/or controlling an industrial process, wherein the computer is configured to train the AI module and/or wherein the AI module is trained according to the method of training an AI module.

A further aspect of the present disclosure relates to a use of an AI module, trained according to the method of training an AI module, for monitoring and/or controlling an industrial system.

A further aspect of the present disclosure relates to a use of a computer with an AI module, which is trained according to the method of training an AI module for monitoring and/or controlling an industrial system.

Any feature, function, step and/or element, which is described hereinabove and hereinbelow with reference to one aspect of the present disclosure, equally applies to any other aspect of the present disclosure, as described hereinabove and hereinbelow.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method of generating a training data set for training an artificial intelligence module (AI module), comprising:

providing, on a data storage, a first data set and a second data set, wherein the first data set includes one or more first data elements indicative of a first operational condition of an industrial system, wherein the second data set includes one or more second data elements indicative of a second operational condition of the industrial system, and wherein the first operational condition substantially matches the second operational condition;

determining a data transformation for transforming the one or more first data elements of the first data set into the one or more second data elements of the second data set;

applying the determined data transformation to the one or more first data elements of the first data set and/or to one or more further data elements of one or more further data sets, thereby generating a transformed data set; and generating a training data set for training the AI module based on at least a part of the transformed data set, wherein at least one of the first data set and the second data set includes failure data descriptive of an operational failure of the industrial system, and wherein at least one of the first data set and the second data set includes nominal operational data descriptive of a nominal operation of the industrial system.

2. The method according to claim 1, wherein generating the training data set comprises providing an initial training data set for training the AI module; and supplementing the initial training data set with the at least part of the transformed data set.

3. The method according to claim 2, wherein supplementing the initial training data set comprises at least one of: adding the at least part of the transformed data set to the initial training data set; and/or replacing at least a part of the initial training data set with the at least a part of the transformed data set.

4. The method according to claim 1, further comprising:

identifying and/or selecting, in the first data set, the one or more first data elements indicative of the first operational condition of the industrial system; and identifying and/or selecting, in the second data set, the one or more second data elements indicative of the second operational condition of the industrial system.

5. The method according to claim 4, wherein the one or more first data elements of the first data set are time-related; and wherein the one or more second data elements of the second data set are time-related.

6. The method according to claim 4, further comprising matching, with respect to at least one operational parameter of the industrial system, the one or more first data elements to the one or more second data elements, wherein the at least one operational parameter is indicative of an operation of the industrial system.

7. The method according to claim 6, wherein the at least one operational parameter is an operation time of the industrial system; and/or wherein the one or more first data elements are matched to the one or more second data element with respect to an operation time of the industrial system.

8. The method according to claim 1, wherein the data transformation is determined element-wise for each of the one or more first data elements.

9. The method according to claim 1, wherein the data transformation is determined using a machine learning algorithm.

10. The method according to claim 1, wherein the data transformation is determined using at least one of Kernel-density estimation, Gaussian regression, an artificial neural network, a generative adversarial network, a sum product network, and an adversarial neural network.

11. The method according to claim 1, wherein the data transformation is determined in a non-probabilistic manner.

12. The method according to claim 1, wherein at least one of the first data set and the second data set includes simulation data descriptive of simulating an operation of the industrial system; and wherein at least one of the first data set and the second data set includes operational data descriptive of an actual operation of the industrial system.

13. The method according to claim 1, wherein the first data set includes simulation data descriptive of simulating an operation of the industrial system and the second data set includes operational data descriptive of an actual operation of the industrial system; and wherein determining the data transformation comprises determining a noise of the one or more second data elements of the second data set, such that by applying the data transformation the noise is reproduced in the transformed data.

14. The method according to claim 13, wherein the determined noise is representative of a measurement noise of the one or more second data elements, and wherein the determined noise is representative of an environmental influence affecting the actual operation of the industrial system.

15. The method according to claim 1, wherein the first data set includes the nominal operational data descriptive of the nominal operation of the industrial system and the second data set includes the failure data descriptive of the operational failure of the industrial system; and wherein determining the data transformation comprises determining, in the second data set, the failure data descriptive of the operational failure of the industrial system, such that by applying the data transformation the operational failure of the industrial system is reproduced in the transformed data.

\* \* \* \* \*